United States Patent
Hill et al.

(10) Patent No.: US 8,417,609 B2
(45) Date of Patent: Apr. 9, 2013

(54) METHODS AND SYSTEMS FOR MODELING DEPOSITS' DATA

(75) Inventors: David A. Hill, Jacksonville, FL (US); Tracy R. Beal, III, Victor, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/213,478

(22) Filed: Aug. 19, 2011

(65) Prior Publication Data

US 2013/0046667 A1    Feb. 21, 2013

(51) Int. Cl.
*G06Q 40/00* (2012.01)
*G06F 9/45* (2006.01)
*G06F 9/44* (2006.01)
*G06F 9/445* (2006.01)

(52) U.S. Cl. ............ 705/35; 703/22; 717/124; 717/126; 717/135; 717/171; 717/177

(58) Field of Classification Search .................... 705/35; 703/22; 717/124, 126, 135, 171, 177
See application file for complete search history.

(56) References Cited

U.S. PATENT DOCUMENTS

| | | | | |
|---|---|---|---|---|
| 5,357,452 A * | 10/1994 | Pio-di-Savoia et al. | ....... | 702/108 |
| 5,799,266 A * | 8/1998 | Hayes | ............ | 702/123 |
| 5,905,856 A * | 5/1999 | Ottensooser | ................ | 714/38.1 |
| 6,129,271 A * | 10/2000 | Kubitz | ............. | 235/379 |
| 6,412,106 B1 * | 6/2002 | Leask et al. | ................... | 717/124 |
| 7,168,065 B1 * | 1/2007 | Naccache et al. | ............. | 717/127 |
| 7,664,989 B2 * | 2/2010 | Joshi et al. | ................ | 714/38.14 |
| 7,917,895 B2 * | 3/2011 | Givoni et al. | ................ | 717/124 |
| 2005/0204344 A1 * | 9/2005 | Shinomi | ....................... | 717/124 |
| 2005/0283761 A1 * | 12/2005 | Haas | .......................... | 717/124 |
| 2007/0198970 A1 * | 8/2007 | Horii et al. | ..................... | 717/124 |
| 2007/0240127 A1 * | 10/2007 | Roques et al. | ............... | 717/136 |
| 2007/0294671 A1 * | 12/2007 | Demetriou et al. | ........... | 717/124 |
| 2008/0300943 A1 * | 12/2008 | Simpson et al. | ................ | 705/8 |
| 2010/0076882 A1 | 3/2010 | Butler et al. | | |
| 2010/0192220 A1 * | 7/2010 | Heizmann et al. | .............. | 726/19 |
| 2011/0029963 A1 * | 2/2011 | Smith et al. | .................... | 717/171 |

* cited by examiner

*Primary Examiner* — Kenneth Bartley
(74) *Attorney, Agent, or Firm* — Weiss & Arons LLP; Michael Springs

(57) ABSTRACT

Systems and methods according to the invention preferably determine errors in a financial institutions implementation of production changes, production modifications and/or a new production release by comparing critical interface data from a production cycle to critical interface data from a test environment cycle.

18 Claims, 5 Drawing Sheets

FIG. 3

Chart of Exceptions to Rules — 302

| Product — 304 | Interest Rate — 306 | Balance — 308 | Affinity — 310 | Count of Accounts — 312 |
|---|---|---|---|---|
| Business Investment Analyzed Account | 4.41%–10% | $.5 mm – $.75 mm | None | 3 |
| Business Investment Non-Analyzed Account | 5.89% | $ 475K | None | 4 |
| Public Funds Interest Checking | 3.13%–5.19% | $0 | None | 1 |
| Business Advantage Free Business Interest Maximizer | 3.13% | $0 | Trust Money Market SAvings | 6 |

Model Deposit Data Integrity & Validation
NCA Exception Statement Comparison

IMNCA01-2          IMPACS ACCOUNT MASTER REPORT
06/15/2011 13.45.10    NCA EXCEPTIONS, TYPE=NOT FOUND

| ENT<br>ID | EN<br>NM | ACCOUNT<br>NUMBER | AFFIN<br>GRPID | ACT.<br>TYP | ANNUAL<br>RATE | AFFINITY<br>DESCRIP | AFF EXPIRE<br>DATE | COUNT | CURRENT<br>BALANCE | ANC<br>TYP | S/C<br>TYP | AC<br>ST | REG<br>ID |
|---|---|---|---|---|---|---|---|---|---|---|---|---|---|
| 001 | NC | xxxxxxxxxx | xxx | xx | xx | VALUE — 404 | — 406 | | | SAV | 224 | 00 | 001 |

Deposit Accounts

Affinity Branding — 408 → Value Money Market Savings-NC → Product Branding 410
Regular Savings John Smith        Jane Doe Your Account at a Glance Account Number                              xxxx xxxx xxxx
Beginning Balance on 06-06-11                        0.00
Deposits and Other Additions              +$     3,610.84
Ending Balance on 06-10-11                       3,610.84

SI

Annual Percentage Yield Earned this Statement
Period: 0.05%
Interest Paid Year to Date: $0.04

METHODS AND SYSTEMS FOR MODELING DEPOSITS' DATA

FIELD OF TECHNOLOGY

Aspects of the present invention relate to modeling deposits' data.

BACKGROUND

This invention is related to reducing quality-related defects in areas such as payments to customers.

More specifically, this invention relates to helping a financial institution comply with regulatory requirements associated with the banking industry. Further, this invention relates to helping financial institutions satisfy operational service level agreements ("SLAs"). In short, this invention relates to ensuring that financial institutions satisfy their respective obligations—i.e., they fulfill their promises to customers.

In addition, many times customers discover anomalous treatment of accounts prior to identification of such treatment by the financial institution holding the accounts. Such anomalous behavior may deprive customers of funds owed to them under operational SLAs. Prior discovery by customers of such deprivation creates ire on the part of the customer.

It would be desirable to provide systems and methods that satisfy customer expectations and ensure compliance with relevant regulations.

It would be further desirable to help quickly detect anomalous behavior, preferably prior to customer detection.

It would be still further desirable to identify systematic inefficiencies, reduce foregone revenues, minimize undue refunds and minimize operational losses attributable to quality-related defects in the area of payments.

SUMMARY

Systems and methods according to the invention provide various approaches to modeling deposits' data integrity and validation. One method may include storing in computer memory deposits data. The method may further include using a processor(s) to conduct a production cycle based on the deposits data stored in the computer memory. In response to the conducting a production cycle, the method may also include using the processor(s) to compile critical interface data. Further, the method may include using the processor(s) to conduct a test production cycle in a test environment based on the deposits data stored in the computer memory. The test production cycle may include changes to the production cycle attributable to a release of changed production. In response to the conducting the test production cycle, the method may include compiling test critical interface data. The method may also include using the following equation to determine the pre-release effects of the production changes, production modifications and/or a new production release:

$$|CIDpc - CIDte| = \Delta cmr, \text{ where}$$

CIDpc=Critical Interface Data from production cycle
CIDte=Critical Interface Data from test environment cycle
$\Delta cmr$=changes attributable to production changes, production modifications and/or a new production release.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows a high interest rate exception matrix according to the invention;

FIG. 4 shows an NCA exception report according to the invention; and

DETAILED DESCRIPTION OF THE DISCLOSURE

Figure 1:
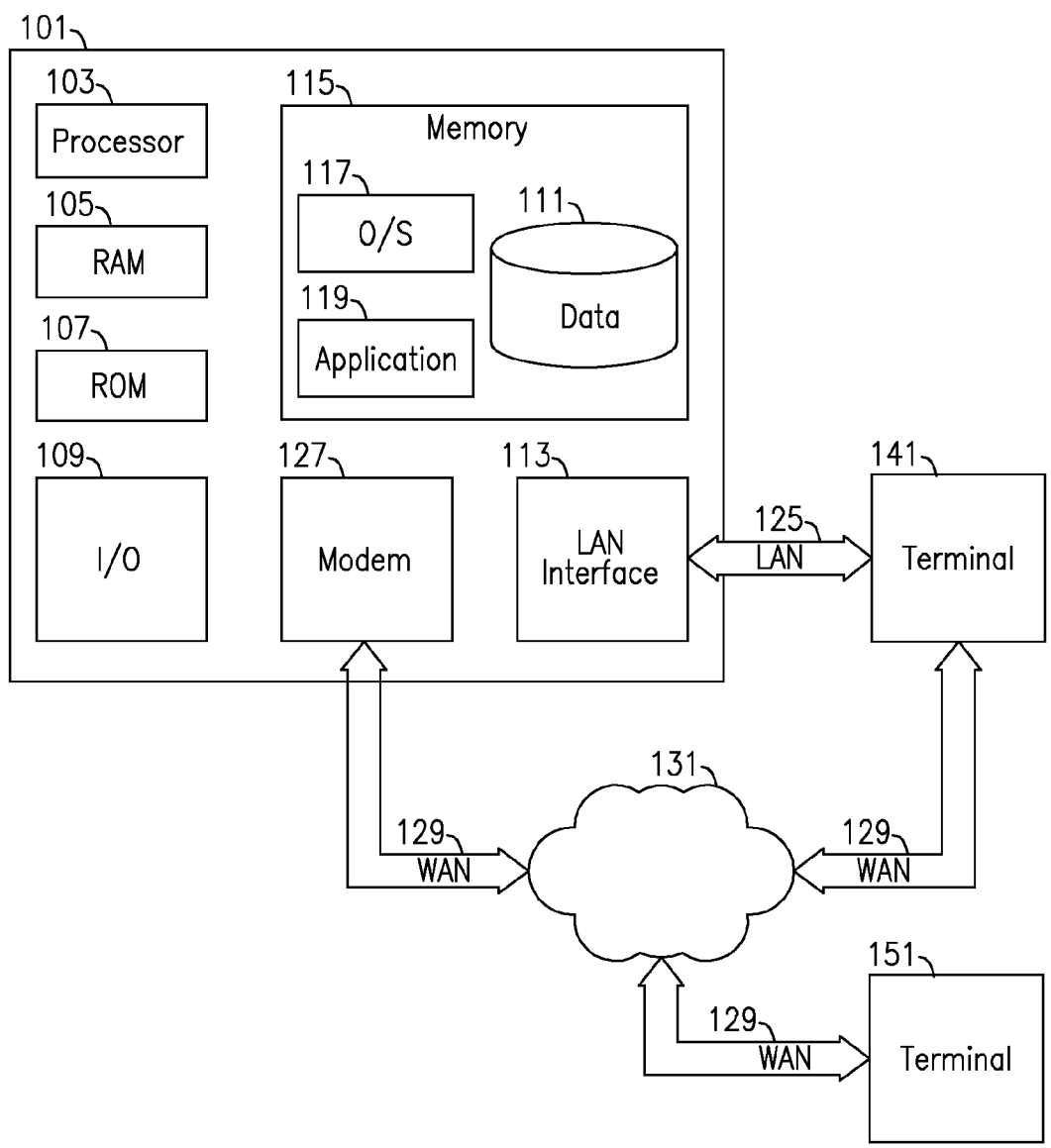
FIG. 1 shows illustrative apparatus that may be used in accordance with the principles of the invention.

One aspect of the present invention relates to interest rate calculation validation. This aspect first identifies interest-bearing checking, savings, certificate of deposit ("CD") and individual retirement account ("IRA") products.

Once these products have been identified, systems and methods according to the invention may create exception report(s). These reports may include systematically recalculating accrued interest at the account level. The recalculated accrued interest may be recalculated in a non-production—i.e., non-live—environment. These reports may compare the accrued interest to system-calculated accrued interest.

In some embodiments, the exceptions on the report may be validated via calculation of interest accrued.

One of the exception reports according to the invention is a high interest rate exception report. Such a report preferably lists any accounts which pay interest at rates that are above a predetermined threshold amount. Such exceptions may preferably be transferred to a separate matrix for additional viewing and/or manipulations.

For example, systems and methods according to the invention (referred to hereinafter, collectively, as "the system") review the identified products. In response to the review, the system generates an exception report including all checking and savings accounts (or similar products) with a stored interest rate greater than a predetermined threshold amount—e.g., 3%. Additionally, the system reviews all CD and IRA accounts with stored interest rate greater than a predetermined threshold amount—e.g., 6%.

In certain embodiments, following creation of the report, the system validates the findings. In such embodiments, the system outputs a matrix, display or other compendium of information, which may include such information as: the product type reviewed; the target interest rate window; and whether the exceptional account was related to any particular special offer within the financial institution. In certain embodiments, the invention may also include the total number of exceptions for each individual product and/or any other suitable metric.

For the purposes of this application, such offers and/or products may be identified by a non-contractual affinity ("NCA") code. In order to determine whether a particular exception was part of a special offer, such as a promotional offer or other offering, within the financial institution, the system may determine whether the exception is associated with an affinity code.

In certain embodiments of the invention, a product/NCA combination—i.e., an association of a particular product, such as a savings account having a pre-determined interest rate, with an NCA—is analyzed to determine whether the combination is valid. Some embodiments may preferably query an affinity rate table to determine which product/NCA combinations are valid and which are invalid. An exception report according to the invention may preferably include instances of invalid combinations.

Another aspect of the invention relates to reviewing and validating the NCA code list. More particularly, the system validates the account parameters associated with each of the NCA codes. For example, the system validates that the product codes correspond to the product codes associated with each of the NCA codes.

In the event that a product code does not correspond to the product code associated with the NCA, the system may preferably include such non-corresponding product codes, with account identifiers, on an NCA exception report. An NCA exception report may include the NCA code reviewed, the accepted product code and/or the exceptional product code.

Yet another aspect of the invention relates to program pre-release validation. This aspect of the invention preferably ensures that existing products and functionality are not unintentionally impacted by any new change introduced into the financial institution production—i.e., the processing of accounts by the financial institution.

One experimental application of the program pre-release validation aspect of the invention tested complete portions of the production account portfolio for the equivalent of two model states. Such a sample may be the size of a small regional bank. In the test application, all the checking, savings, CD & IRAs accounts in these two states were considered. While not part of the experimental application, validation of fees and debit card transactions may also be considered within the scope of the invention.

The test application selected critical data components such as transactions, control files, master files, statement files, etc. The test application environment focused on legacy processing of the accounts as well as the relative changes related to a new product, or, alternatively, a product modification or new release.

The experimental application ran a parallel batch cycle in a test application environment that corresponded to the production environment, and only differed with respect to the pre-release changes. The parallel batch cycle systematically recalculated daily accrual amounts, independent of the system-of-record production posting process.

The system then executed a file compare of the current production cycle output to the test application environment output using the same day inputs in order to detect any unintentional changes. Thereafter, the system may identify any defects—i.e., any mismatches between the calculated interest accrual and the daily accrual stored by the system-of-record—and determined any root cause failures for the defects.

In addition to the pre-release validation testing, the system may execute a post-release validation test. Such a post-release validation test compares the current production, prior to the release, against a production application environment also including the release. As such, the post-release validation preferably validates the operation of the release in production against a prior production environment.

In some embodiments of the invention, pre-release production data may be compared to post-release production data for a pre-determined period of time—e.g., five days—prior to and following the release of the new product and/or product modification. In some embodiments of the invention, critical data validated includes total account balances, interest paid, interest accrued month-to-date ("MTD") and/or total fees. Preferably, any identified differences may be placed into a suitable output format and then output. In certain embodiments of the invention, only identified differences above a pre-determined threshold amount are included in the output.

In certain embodiments of the invention, a daily review of total volume and daily change to an account may be performed. Such review may provide an early warning tool to recognize unanticipated fluctuation in balances and totals.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used in accordance with the principles of the invention. Server 101 may be included in a customer access device, an account access control module, or in any other suitable apparatus that is shown or described herein.

Server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide storage for deposits data, interest rate information, NCA information, and/or any other suitable information.

Server 101 may operate in a networked environment supporting connections to one or more remote computers, such as terminals 141 and 151. Terminals 141 and 151 may be servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Any information described above in connection with database 121, and any other suitable information, may be stored in memory 115.

One or more of applications 119 may include one or more algorithms that may be used to perform one or more of the following: deposits' data modeling, validation of deposits' data and/or creation of a test environment(s).

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
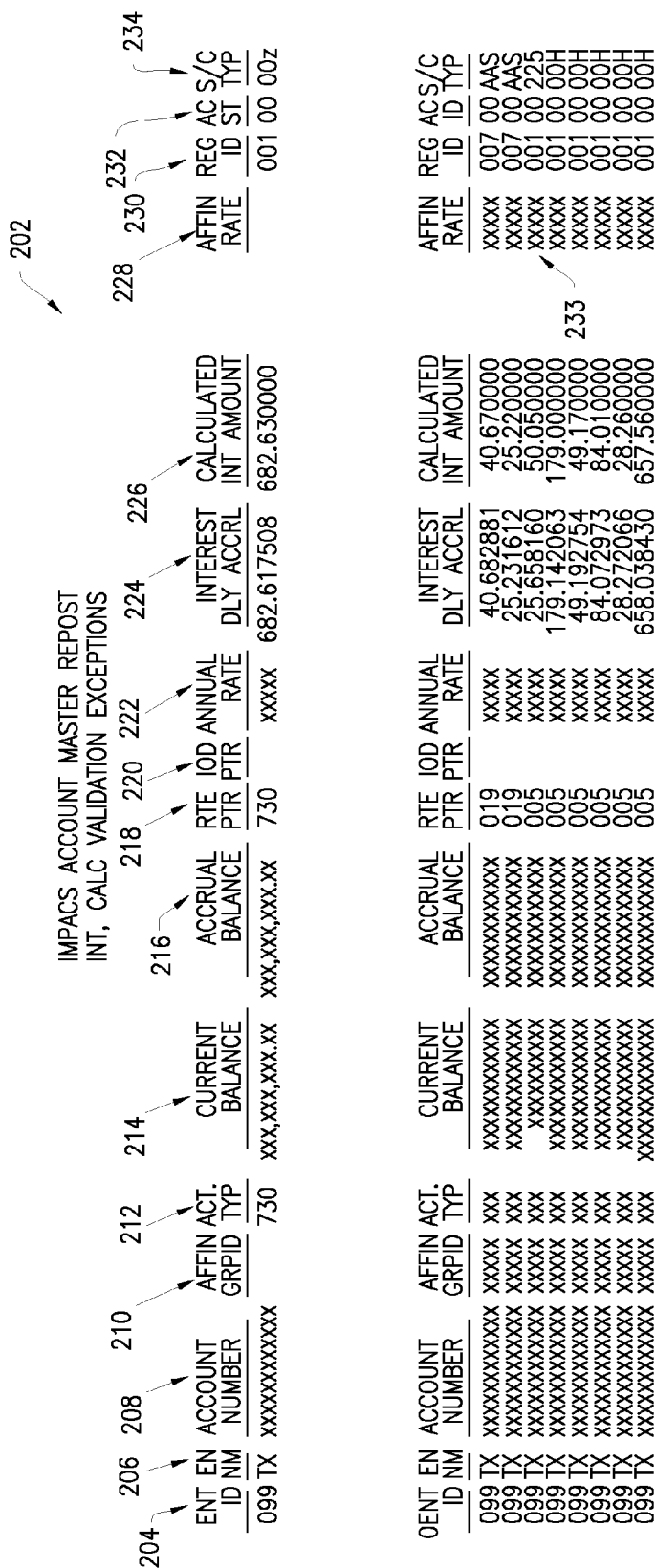
FIG. 2 shows an exemplary account master report according to the invention.

FIG. 2 shows an exemplary account master report 202 according to the invention. The report lists interest calculation validation exceptions. The following terminology is used in the report.

ENT ID 204=Entity ID=State Code
EN NM 208=Entity Name=2 character state
ACCOUNT NUMBER=208
AFFIN GRPID 210=Affinity Group ID=numeric code to identify an Affinity relationship
ACT TYP 212=Account Type=numeric Product Code
CURRENT BALANCE=214
ACCRUAL BALANCE=216
RTE PTR 218=Rate Pointer=numeric code pointing to a tiered rate (providing different interest rate for different deposit amounts) in a Rate Table.
IOD PTR 220=Interest-On-Demand Pointer=numeric code pointing to a non-tiered rate in a Rate Table.
Annual Rate 222=Annual Interest Rate.
Interest DLY ACCRL 224=Daily Interest Accrual Amount=one day's worth of interest as calculated by the application
CALCULATED INT AMOUNT 226=Daily interest accrual amount as calculated by a validation process according to the invention.
AFFIN RATE 228=Affinity Rate=Interest Rate used if affinity ID is present on the account.
REG ID 230=Region ID=subgroup of interest rates on the rate table.
AC ST 232=Account Status (Open, Closed, etc. "00" is Open).
S/C TYPE 234=Service Charge Type=code that helps identify product and type of charging against the account.
AFFINITY RATE FLAG 233=Indicates a disparity between the affinity rate and the annual rate 222

With respect to interest rate calculation validation exceptions, the systems and methods of the invention focus primarily on the differences reported between the calculated interest amount and the interest daily accrual. The following exemplary equation was used to identify the exceptions:

$$\text{exception}=|\text{calculated in amt.}-\text{int. daily accrual}|$$

Thus, the interest calculation validation is preferably not adjustable. Accordingly, for the validation to pass, the calculated interest amount should match the interest daily accrual exactly.

The calculated interest amount and the interest daily accrual differ by between 1 cent and $25.00. It should be noted that these differences occurred on a daily determination of interest.

At 233, affinity rate appears with a question mark flag. The question mark flag highlights an exemplary difference that exists (not shown in order to prevent identification of the actual account balances) between the affinity rate and the annual rate. In this particular instance, the difference between the affinity rate and the annual rate halves the interest daily accrual. It should be noted as well that such a difference between the affinity rate and the annual rate may also qualify this exception as an exception for the interest rate exception report.

FIG. 3 shows a high interest rate exception matrix 302 according to the invention. Such a matrix is based on the following steps. First, the system may scan checking, savings and/or other related accounts to identify any accounts where the interest rate associated with the account is greater than a pre-determined threshold.

Column 304 shows the type of product analyzed. Column 306 shows the interest rate window, or, alternatively, interest rate threshold, used to identify products. Column 308 shows the total balance associated with all the identified accounts. Column 310 shows any affinity groups with which the identified groups are associated. Finally, column 312 shows the number of identified accounts in each product.

The system may also include identified accounts in an exception report. Thereafter, the system may validate the accrual data against the listing in the report. Such a report may then be output for further determinations regarding the identified accounts.

FIG. 4 shows an NCA exception report 402. Report 402 includes an affinity description 404, an affinity expiration date 406, and an account type 408, as well as many of the other fields described in account master report 202. Also, report 402 shows affinity branding information 408 and product branding information 410. An NCA account is directed to a dedicated account within an institution that may include various unique parameters with respect to interest paid out by the institution as well as other account characteristics, such as monthly maintenance fees.

In one embodiment of the invention, NCA exception report 402 identifies an account(s) that belongs to an NCA but does not conform to the NCA's parameters and/or characteristics.

It should be noted that a matrix that is similar to the matrix shown in FIG. 3 may be used as an output from NCA exception report 402. The system then preferably includes identified exceptional NCA accounts in an exception report. Thereafter, the system may validate the findings of exceptions. Such an NCA report may then be output for further determinations regarding the identified accounts.

Figure 5:
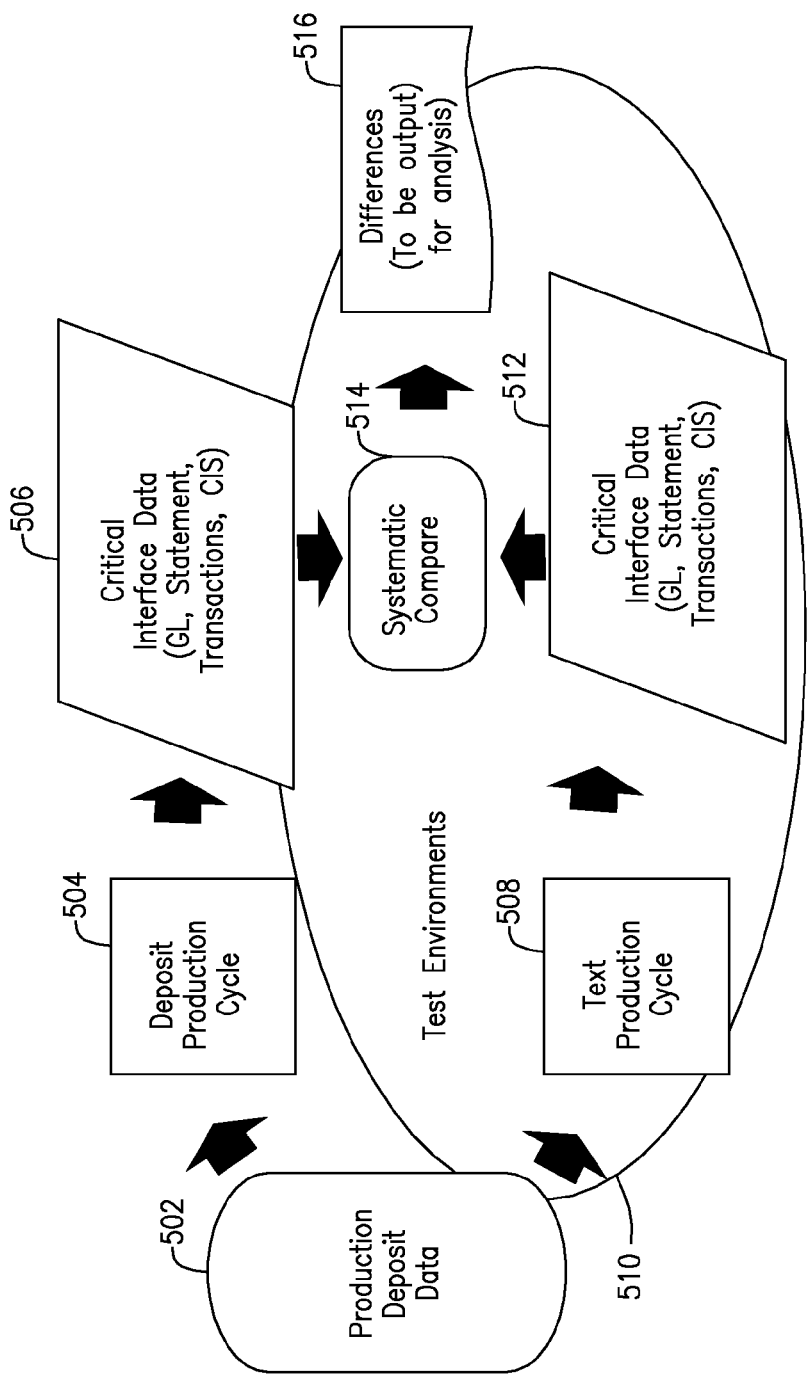
FIG. 5 shows a test application environment according to the invention.

FIG. 5 is directed to yet another aspect of the invention. FIG. 5 is directed to systems and methods of pre-release and post-release validation of a change in production software.

Specifically, FIG. 5 introduces a test application environment according to the invention. The test application environment focuses on production software in addition to the relative changes related to a new product, a product modification, or a new release of a legacy product.

Step 502 shows computer storage of exemplary production deposits data. Step 504 shows conducting an actual production cycle—i.e., the periodic (typically daily) processing of accounts by the financial institution. Step 504 compiles critical interface data 506 such as general ledger data, account statement data, transaction data, customer information system ("CIS") data, etc.

Step 508 shows conducting a test production cycle in test environment 510. Test production environment 510 preferably recreates the production deposits data. Then, step 508 conducts the test production cycle with the only difference being the relative changes related to a new product, a product modification or a new release.

Such testing may be implemented for a pre-release period, such as five days, prior to release of the changes, product modification and/or the release. During this pre-release period, production cycle 504 runs the processing of accounts independent of the release. Test environment 510, on the other hand, runs the processing of the accounts together with the production changes attributable to the changes, product modification and/or release, to obtain critical interface data 512 which accounts for the changes, modification and/or release. Accordingly, the differences between the processing of accounts independent of the release, from step 506, and the processing of the accounts together with the production changes attributable to changes, product modification and/or release, from step 512, should correspond to the differences attributable only to the changes, product modification and/or release.

At step 514, the system may preferably perform a comparison between the critical interface data 506 and 512. Differences output at 516 should correspond to the differences solely attributable to the release information. The following equation 1 represents one embodiment of the method shown in FIG. 5:

$\Delta_{cmr}$=changes attributable to production changes, production modifications and/or a new production release:

$\Delta_{cmr}$=|CIDpc−CIDte|, where:
CIDpc=critical interface data from the production cycle; and
CIDte=critical interface data from the test environment cycle.

It should be noted that the test environment 510 may preferably be implemented on all or a subset of production input (transactions), processing (batch cycle) and/or output (CID) to reprocess the information in a controlled—i.e., non-live production—environment. It should be noted as well that, when the method of FIG. 5 is run on a subset of production information, and the results obtained reflect systematic release implementation errors, then the system may extrapolate from the subset to develop a solution that applies to the entire production cycle.

If |CIDpc−CIDte| differs from $\Delta_{cmr}$ then the system may analyze the differences and, based on the analysis, determine and correct the defects in the implementation of the new release.

In addition, the method shown in FIG. 5 may also be reproduced in a post-release environment for a pre-determined amount of time in order to ensure the accuracy of the release. In such an embodiment, the following equation 2 may apply:

$\Delta_{cmrerror}$=errors in the implementation of production changes, production modifications and/or a new production release:

$\Delta_{cmrerror}$=|CIDpc−CIDte| where:

CIDpc=critical interface data from the production cycle;
CIDte=critical interface data from the test environment cycle.

Thus, methods and apparatus for modeling deposits data have been provided. Persons skilled in the art will appreciate that the present invention can be practiced by other than the described embodiments, which are presented for purposes of illustration rather than of limitation, and that the present invention is limited only by the claims that follow.

What is claimed is:

1. A non-transitory computer-readable medium storing computer-executable instructions which, when executed by a processor on a computer system, perform a method for testing a release of a financial institution production change, the method comprising:
    storing in computer memory deposits data;
    using a processor to conduct a production cycle based on the deposits data stored in the computer memory;
    in response to conducting the production cycle, using the processor to compile critical interface data, wherein the critical interface data comprises financial institution service level agreement ("SLA") data from the production cycle;
    using the processor to conduct a test environment production cycle in a test environment based on the deposits data stored in the computer memory, said test environment production cycle including changes to the production cycle attributable to a release of a production change, production modification and/or new production release:
    in response to conducting the test environment production cycle, compiling test critical interface data, wherein the test critical interface data comprises financial institution SLA data from the test environment production cycle; and
    determining pre-release effects of the production change, production modification and/or new production release, said pre-release effects being characterized as:
$\Delta_{cmr}$=changes attributable to a production change, production modification and/or new production release, said determining using the following equation:

$\Delta_{cmr}=|\text{CIDpc}-\text{CIDte}|$, where:

CIDpc=critical interface data from the production cycle; and
CIDte=critical interface data from the test environment production cycle.

2. The method of claim 1 wherein the critical interface data comprises general ledger data.

3. The method of claim 1 wherein the critical interface data comprises account statement data.

4. The method of claim 1 wherein the critical interface data comprises transaction data.

5. The method of claim 1 wherein the critical interface data comprises customer information system ("realCIS") data.

6. The method of claim 1 wherein the test critical interface data comprises general ledger data.

7. The method of claim 1 wherein the test critical interface data comprises account statement data.

8. The method of claim 1 wherein the test critical interface data comprises transaction data.

9. The method of claim 1 wherein the test critical interface data comprises customer information system ("testCIS") data.

10. A non-transitory computer-readable medium storing computer-executable instructions which, when executed by a processor on a computer system, perform a method for validating a release of financial institution production change, the method comprising:

storing in computer memory deposits data;

using a processor to conduct a production cycle based on the deposits data stored in the computer memory;

in response to conducting the production cycle, using the processor to compile critical interface data, wherein the critical interface data comprises financial institution service level agreement ("SLA") data from the production cycle;

using the processor to conduct a test environment production cycle in a test environment based on the deposits data stored in the computer memory, said test environment production cycle including changes to the production cycle attributable to a release of production changes, production modifications and/or a new production release;

in response to conducting the test environment production cycle, compiling test critical interface data, wherein the test critical interface data comprises financial institution SLA data from the test environment production cycle; and determining post-release effects of the production changes, production modifications and/or a new production release, said post release effects being characterized as:

$\Delta_{cmrerror}$=errors in the implementation of production changes, production modifications and/or a new production release, said determining using the following equation:

$\Delta_{cmrerror}=|\text{CIDpc}-\text{CIDte}|$, where:

CIDpc=critical interface data from the production cycle;
CIDte=critical interface data from the test environment production cycle.

11. The method of claim 10 wherein the critical interface data comprises general ledger data.

12. The method of claim 10 wherein the critical interface data comprises account statement data.

13. The method of claim 10 wherein the critical interface data comprises transaction data.

14. The method of claim 10 wherein the critical interface data comprises customer information system ("realCIS") data.

15. The method of claim 10 wherein the test critical interface data comprises general ledger data.

16. The method of claim 10 wherein the test critical interface data comprises account statement data.

17. The method of claim 10 wherein the test critical interface data comprises transaction data.

18. The method of claim 10 wherein the test critical interface data comprises customer information system ("testCIS") data.

* * * * *